Patented Oct. 16, 1951

2,571,346

UNITED STATES PATENT OFFICE 2,571,346

CHLORINATED POLYISOPRENE

James D. D'Ianni, Akron, Ohio, assignor to Wingfoot Corporation, Akron, Ohio, a corporation of Delaware No Drawing. Application December 9, 1947, Serial No. 790,721

7 Claims. (Cl. 260—94.7)

This invention relates to the chlorination of isoprene polymers.

All synthetic rubbers do not react to chlorination in the same way. For example, it has been noticed that polybutadiene as well as the butadiene copolymers cannot be chlorinated successfully to produce a chlorinated butadiene polymer having a relatively low viscosity. In fact, it has been experienced that when a butadiene polymer is chrorinated in carbon tetrachloride in the presence or absence of oxygen, the polymer being treated becomes insoluble at an early stage in the chlorination and in this stage, the rate of chlorination is so slow that it becomes impractical to continue the treatment. These same difficulties have not been observed when an isoprene polymer is chlorinated. However, it has now been learned that an isoprene polymer which has become oxidized may not be successfully chlorinated to an end product having a chlorine content of at least 55% and up to about 70%, and having a relatively low solution viscosity. The oxidation of an isoprene polymer may be prevented by the addition of antioxidants but operable antioxidants cause a staining or coloration of the chlorinated product. In order to overcome this difficulty, non-staining antioxidants are added but these antioxidants are not operable as antioxidants to fully protect isoprene polymers against the deleterious effects of oxidation, particularly during long periods of storage.

It has now been discovered that a partially oxidized isoprene polymer which is substantially insoluble in carbon tetrachloride may be successfully chlorinated to an end product containing 55 to 70% chlorine and capable of forming solutions having a viscosity of below 100 centipoises for a 20% solution of the product in toluene at 25° C., when the chlorination is carried out in the presence of a chlorinating agent containing a halogen substituent. The only agents which have been discovered to function in this capacity are iodine, acetyl chloride and anhydrous aluminum chloride. These agents may be added to the isoprene polymer being chlorinated either before chlorination or during chlorination in an amount between about .1% to 5% based upon the rubber being treated. Iodine is the preferred agent and is preferred to be used in amount between 0.5 to 1.5%.

The effect of the use of these agents in producing a low viscosity chlorinated isoprene polymer is shown in the examples reported below. The results reported in the table below for Examples 1 through 7, are from experiments in which polyisoprene rubber was first sheeted out and then made up into 5% carbon tetrachloride solutions. Other inert solvents may be used including chloroform, ethylene dichloride and other of the well known solvents for chlorinated rubbers. These seven samples were all jell-like in character since the rubber had become oxidized and therefore substantially insoluble in the carbon tetrachloride. Each of these samples of polyisoprene cements had a Williams plasticity of 396/346 measured in accordance with the method reported in Industrial and Engineering Chemistry 16, 362 (1924). The chlorination of each of the seven samples was carried out by passing the chlorine into the cement at the rate of 1.2 grams per minute for two hours at a temperature of 50° C. After the chlorination was completed, the chlorinated solutions were aged by standing at room temperature for 22 hours. The product was then isolated from solution by steam distillation and redissolved in toluene to a 20% solution. Viscosity was then determined in a #4 Ford cup at 25° C. In general, it has been found desirable to age the chlorinated solution because further chlorination by the residual chlorine takes place and the viscosity of the product is decreased. The product may be chlorinated for a length of time depending on the size of the batch and the amount of chlorine desired to be added.

In the first example, the chlorination was carried out in the absence of a chlorinating agent. In the second example, 1% of iodine was added and up to the first 45 minutes of chlorination there was little difference in viscosity between the solution and that of the control. However, after 45 minutes, the jelled cement thinned out and within 60 minutes, it was very thin and the viscosity remained at its low value after cooling to room temperature. In Example 3 an exceptionally low viscosity was observed when the chlorination was carried out in the presence of 1% of iodine for one hour and then in the presence of air as well as iodine for an additional hour. In Examples 4, 5, 6 and 7 the same sort of reaction was also carried out with respect to acetyl chloride and aluminum chloride, first in the absence of air for one hour and then in the presence of air for one hour.

| Example | Treatment | Product Viscosity | Per Cent Cl |
|---|---|---|---|
| 1 | None | 200 cps [1] | 61.56 |
| 2 | 1% Iodine | 15 | 65.18 |
| 3 | 1% Iodine plus air | 8 | 64.53 |
| 4 | 4% Acetyl chloride | 63 | 62.43 |
| 5 | 4% Acetyl chloride plus air | 49 | 61.23 |
| 6 | 2% Al Cl₃ | 67 | 60.70 |
| 7 | 2% Al Cl₃ plus air | 35 | 59.84 |

[1] This contained some gel in the toluene solution.

A solution viscosity of 3 cps. was observed when oxidized polyisoprene was first hot milled for 30 minutes in the presence of 2% of a chemical plasticizer comprising a mixture of 1/3 naphthylbetamercaptan and 2/3 inert hydrocarbon and as an antioxidant 1% phenylbetanaphthylamine, and then chlorinated in the presence of 1% of iodine for one hour and then in the presence of air as well as iodine for an additional hour. The product contained 63% chlorine. Similarly reduced viscosities were also observed when using 4% acetyl chloride in which a product viscosity of 18 cps. was obtained after chlorination for one hour in the absence of air. When air was added and chlorination continued for one hour a product was obtained having a viscosity of 8 cps. The use of 2% aluminum chloride without and with air gave a product viscosity of 18 cps. after a total of 2 hours' chlorination, first for 1 hour in the absence of air, then for 1 hour in the presence of air. In each of these examples, the chemical plasticizer and the antioxidant mentioned above was present. Others may be used but these are preferred.

When butadiene polymers were chlorinated under similar conditions, viscosities above 300 cps. were the lowest that could be obtained. For example, when a copolymer of 75 parts of butadiene-1,3 and 25 parts of styrene was chlorinated for three hours in the presence of 3% of iodine at a temperature of 50° C., a solution viscosity of the chlorinated end product of 396 cps. was obtained in a 20% solution of toluene at 25° C.

It is preferred to bubble air through the isoprene solution together with the chlorine because the presence of air increases the rate of chlorination and aids in the production of a low viscosity product.

Other isoprene polymers which may be successfully chlorinated in accordance with the present invention are copolymers of isoprene with such monomers as styrene, monochlorostyrene, dichlorostyrene and alkyl styrenes. These styrenes have the general formula

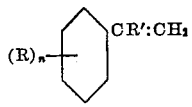

in which R and R' are a halogen, alkyl or hydrogen and in which $n$ is 1 or 2. The isoprene copolymer is made by copolymerizing a mixture containing 50 to 95% of isoprene and 50 to 5% of the vinyl monomer.

Suitable changes may be made in the details of the process without departing from the spirit or scope of the present invention, the limitations of which are defined in the appended claims.

I claim:

1. The process of chlorinating synthetic polyisoprene at atmospheric pressure comprising treating a solution of the polyisoprene with chlorine in the presence of 1 to 5% of an agent from the group consisting of iodine, acetyl chloride, and anhydrous aluminum chloride until a product containing 59.84 to 65.18% chlorine and having a viscosity at 25° C. in 20% toluene solution of below 100 centipoises is obtained.

2. Process of chlorinating synthetic polyisoprene at atmospheric pressure comprising treating a solution of the polymer with chlorine in the presence of 1% of iodine at about 50° C. for about 2 hours.

3. Process of chlorinating synthetic polyisoprene at atmospheric pressure comprising treating a solution of the polymer with chlorine in the presence of air and 1% of iodine at about 50° C. for about 2 hours.

4. Process of chlorinating synthetic polyisoprene at atmospheric pressure comprising treating a solution of the polymer with chlorine in the presence of 4% of acetyl chloride at about 50° C. for about 2 hours.

5. Process of chlorinating synthetic polyisoprene at atmospheric pressure comprising treating a solution of the polymer with chlorine in the presence of air and 4% of acetyl chloride at about 50° C. for about 2 hours.

6. Process of chlorinating synthetic polyisoprene at atmospheric pressure comprising treating a solution of the polymer with chlorine in the presence of 2% of aluminum chloride at about 50° C. for about 2 hours.

7. Process of chlorinating synthetic polyisoprene at atmospheric pressure comprising treating a solution of the polymer with chlorine in the presence of air and 2% of aluminum chloride at about 50° C. for about 2 hours.

JAMES D. D'IANNI.

REFERENCES CITED

The following references are of record in the file of this patent:

UNITED STATES PATENTS

| Number | Name | Date |
| --- | --- | --- |
| 1,544,534 | Ellis | June 30, 1925 |
| 2,470,952 | Remy | May 24, 1949 |

FOREIGN PATENTS

| Number | Country | Date |
| --- | --- | --- |
| 531,852 | Great Britain | Jan. 13, 1941 |

OTHER REFERENCES

Endres: Rubber Age, 55, pages 363, 365, July 1944.

D'Ianni et al.: Ind. Eng. Chem., 38, pp. 1175–1181. November 1946.